(No Model.)
A. HELMER.
EGG CARRIER.
No. 359,927. Patented Mar. 22, 1887.
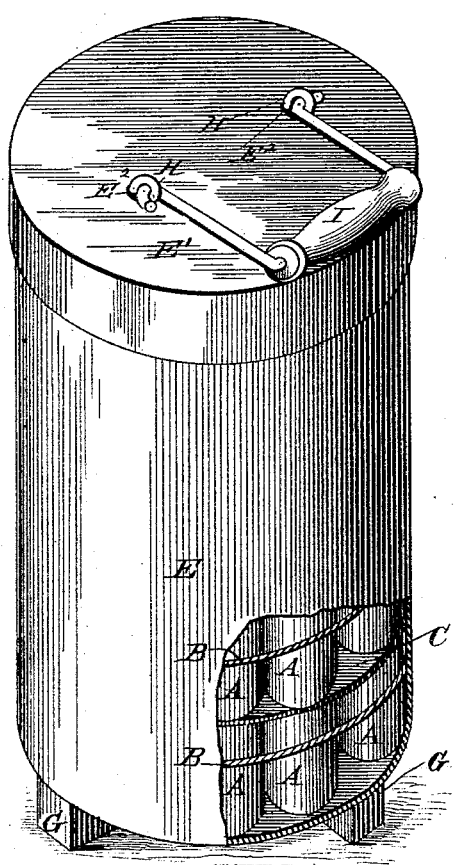
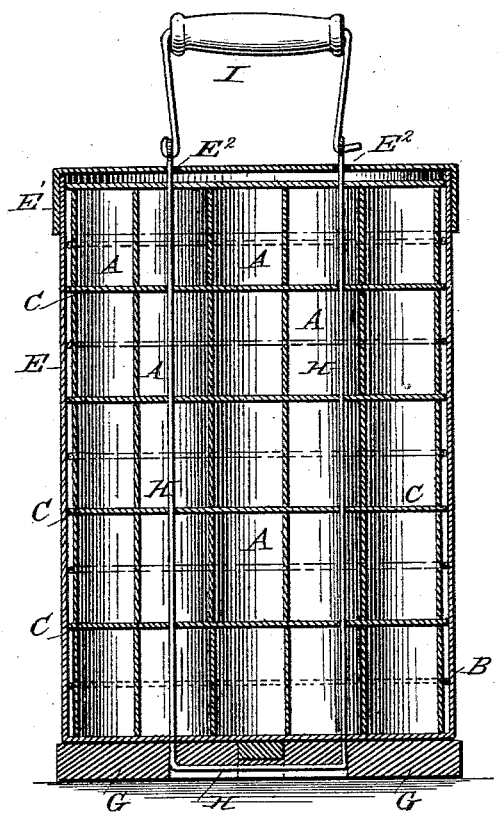
WITNESSES:
Fred G. Dieterich
Solon C. Kemon
INVENTOR:
A. Helmer
BY Munn & Co.
ATTORNEYS.

UNITED STATES PATENT OFFICE.

AUGUSTUS HELMER, OF ST. ELMO, COLORADO.

EGG-CARRIER.

SPECIFICATION forming part of Letters Patent No. 359,927, dated March 22, 1887.

Application filed August 13, 1886. Serial No. 210,825. (No model.)

*To all whom it may concern:*

Be it known that I, AUGUSTUS HELMER, of St. Elmo, in the county of Chaffee and State of Colorado, have invented a new and useful Improvement in Egg-Carriers, of which the following is a specification.

My invention consists in an improved egg-carrier, which is also designed to be used for carrying fruit and other articles, and which will be hereinafter fully described and claimed.

Referring to the accompanying drawings, Figure 1 is a perspective view of my improved egg-carrier, parts being broken away. Fig. 2 is a vertical section of the same.

The same letters of reference indicate corresponding parts in all the figures.

Referring to the several parts by letter, A A A represent the small inner cells, each of which is made of a single strip of paper or pasteboard, the overlapping edges of which are pasted together, so as to form a small cylinder open at each end. In packing the cells in the outer case, E, they are arranged side by side, as shown, preferably to the number of three dozen and one, or thirty-seven, or according to the size of the outer case, in which they are to be packed, and a cord, B, is then tied around them to hold the bunch of cells together and enable them to be conveniently handled; or the cells may be glued or cemented together. The outer case, E, is made of pasteboard, tin, or other material in the form of a cylinder closed at its lower end, and having the close-fitting top cover, E', this outer case being of any desired size. The cells A are packed in it in layers, as they are tied or fastened together, the layers of cells, in which the eggs or fruit are packed, being separated by the sheets of pasteboard C, one of which is placed over each layer of cells.

G represents a base-piece, preferably formed of two light wooden pieces crossed at their centers to form a support on which the outer case rests, and a stout wire, H, bent at its central portion so as to have its free ends parallel with one another, passes through this base-piece, as shown, and its free parallel ends extend up through the bottom of the outer case and through registering-apertures in each of the pasteboard sheets C, and through similar apertures, $E^2$, in the close-fitting cover E', their extremities being hooked to adapt them to engage with the hooked ends of the handle I, by which the outer case is carried. It will be seen that by this arrangement all of the weight is thrown on the handle itself, thereby enabling the outer case to be made slighter and of less weight than if it were to be carried by a bail like a pail or bucket in the usual manner, while by this construction it is impossible for the bottom of the outer case to break away and fall out on account of the weight resting upon it.

From the foregoing description, taken in connection with the accompanying drawings, it will be seen that my improved carrier is exceedingly simple, light, strong, cheap, and efficient, as a large number of cells may be packed in the smallest possible space. Both the inner cells and the outer case, being constructed, preferably, entirely of paper, are exceedingly light, and may be manufactured and sold at a very small cost, while the device is exceedingly durable and very convenient to handle.

Having thus described my invention, I claim and desire to secure by Letters Patent—

1. The combination, with the outer casing having the removable top, of the cylindrical cells, the intervening sheets, the base-piece provided with the upwardly-extending wires having the hooked upper ends, and the removable handle, substantially as and for the purpose set forth.

2. The combination, with the outer cylindrical casing having the removable top, of the cylindrical cells and the retaining-strings, the intervening sheets arranged as described, the base-piece provided with the upwardly-extending wires, having the hooked upper ends, and the detachable handle, all constructed and arranged as set forth.

AUGUSTUS HELMER.

Witnesses:
JOSEPH MONTEE,
T. N. HUBBARD.